United States Patent [19]

Joyner, Jr. et al.

[11] 4,308,491
[45] Dec. 29, 1981

[54] AUTOMATIC FAULT PROTECTION SYSTEM FOR POWER RECOVERY CONTROL

[75] Inventors: F. Carl Joyner, Jr.; Julius M. Liptak, both of Columbia; Richard W. Roof, Lexington, all of S.C.; Kenneth S. Berton, Monroeville, Pa.

[73] Assignee: Square D Company, Palatine, Ill.

[21] Appl. No.: 146,968

[22] Filed: May 5, 1980

[51] Int. Cl.$^3$ .............................................. H02P 7/58
[52] U.S. Cl. ..................................... 318/732; 363/37; 363/58
[58] Field of Search ........ 318/731, 732, 766, 820–823; 363/37, 55–58

[56] References Cited

U.S. PATENT DOCUMENTS

| | | | |
|---|---|---|---|
| 3,515,969 | 6/1970 | Magnuson et al. | 318/732 |
| 3,519,909 | 7/1970 | Mathias et al. | 318/731 X |
| 3,536,984 | 10/1970 | Rosenberry, Jr. | 363/58 |
| 4,237,531 | 12/1980 | Cutler et al. | 363/58 |
| 4,238,821 | 12/1980 | Walker | 363/58 |

*Primary Examiner*—William M. Shoop
*Attorney, Agent, or Firm*—Michael J. Femal

[57] ABSTRACT

An adjustable speed pumping system includes a plurality of pumps respectively driven by variable speed A.C. motors each having a power recovery circuit. Each power recovery circuit includes a series connected rectifier bridge, an inductive reactor and an inverter coupled to the secondary winding of the motor which has an A.C. source connected to the primary winding. A fault clearing mechanism is included in each circuit and includes solid state switches in the bridge actuated by a current level sensor coupled to the inverter output. The power recovery circuit also includes current foldback circuitry and secondary gating circuitry coupled to thyristors in the inverter. The power recovery circuits can be connected in parallel with a single motor and the system includes circuitry for sensing the highest amplitude current in the parallel circuits and controlling all circuits with this current. Each pump has a valve associated with the outlet and circuitry associated therewith to operate the pump at a low forward speed upon receipt of a stop command until the valve is closed to prevent significant reverse flow through the pump.

41 Claims, 22 Drawing Figures

AUTOMATIC FAULT PROTECTION SYSTEM FOR POWER RECOVERY CONTROL

DESCRIPTION

1. Technical Field

The present invention relates generally to adjustable speed motor control systems and more specifically to a solid state controller that has a secondary power recovery system incorporated therein.

2. Background Prior Art

The use of larger horsepower A.C. variable speed motors of the constant torque variety have been in existence in many industries for years. In variable speed drives of this type, the motor is operating at less than maximum speed a substantial period of time which will result in a loss of energy since the amount of energy available to the motor must of necessity be of such a level that is equivalent to operation at maximum speed.

Quite recently, systems have been developed wherein the energy that is not being consumed, when the motor is operating at less than full speed, is returned to the energy source and reused to improve the overall energy utilization.

One such system that is presently being used was developed by the assignee of the present invention and is a solid state recovery system that is incorporated into the power circuit for a motor. Essentially, the primary windings of the variable speed motor are energized from an A.C. three-phase power supply and the secondary windings of the motor are connected to a rectifier bridge where the motor rotor potentials are converted from an A.C. power to a D.C. power. The D.C. power is then fed through a filter reactor, which forms part of the drive protective system, to a line-commutated converter-inverter which converts the D.C. power to an A.C. power. This converted power is then transmitted back to the incoming power lines to make more effective use of the overall power transmission capability of the entire system.

Since these systems are normally used at a remote location and are operated without attendants, provision must be made for the system to be capable of overcoming transient electrical disturbances which may appear on the incoming power feed lines or may be radiated to the drive system from external sources. These disturbances can cause faults to occur in the power line-commutated inverter which can cause large current surges in the power circuit that can damage the equipment. In secondary power recovery circuits, it was determined that, during a fault caused by transient electrical disturbances, the energy from the motor and the energy from the power supply combine to form a continuous current flow through the power circuit resulting in a rapid build-up of the current to a point where the circuit breakers are opened within the drive system. This means that the system will shut down and will require manual reactivation.

SUMMARY OF THE INVENTION

According to the present invention, a fault clearing mechanism is incorporated into a power recovery drive system for a variable speed motor driven from an A.C. power source which has primary and secondary windings respectively connected to the source and to a rectifier bridge which converts the A.C. potential to a D.C. voltage that is fed into an inductive reactor and a solid state inverter in series with the inductive reactor. The solid state inverter converts the D.C. voltage to an A.C. voltage output which is returned to the A.C. source.

The fault clearing mechanism consists of a solid state switch means incorporated into the rectifier bridge and a current level sensing means electrically coupled to the output of the solid state inverter which senses the increase of the current from the inverter, which may result from a fault, and provides a representative signal of a current increase above a preselected level. The representative signal is fed to a control means to actuate the solid state switch means in the rectifier bridge and produce a short across the rectifier bridge to cause the D.C. voltage to drop to zero. When the D.C. voltage drops to zero, the inductive reactor operates to absorb and buffer at least one full cycle of A.C. voltage without saturation, such that the fault energy is dumped back into the main power source enabling the inverter current to drop to substantially zero and allow the fault to clear.

According to one aspect of the invention, the control means also has means for automatically shutting down the system when a predetermined number of faults occur within a predetermined time span to prevent destruction of components within the system.

In the specific embodiment illustrated, the solid state switch means includes a thyristor for each of the three lines of the motor secondary wndings which are simultaneously activated by the electronic control means to produce a low impedance current flow path in the rectifier bridge.

According to a further aspect of the invention, the solid state switch means or thyristors can also be utilized as a control system for automatically separating the solid state inverter from the remainder of the control system when the variable speed motor reaches its maximum speed, at which time there is effectively no excess energy which can be returned to the main power source. This is accomplished by activating the solid state switch means or thyristors when the voltage in the inverter section of the circuit drops below a predetermined level so that the secondary winding circuit of the motor is effectively separated from the inverter section of the circuit.

According to a further aspect of the invention, the control system also incorporates a mechanism for effectively reducing the variable speed range of the motor thereby reducing the requirements for the components in the system. This is accomplished by placing a resistor section in the control circuit between the secondary winding of the motor and the rectifier bridge. The resistor section includes a resistor for each of the lines leading from the secondary winding of the motor and a parallel switch across each of the resistors with a voltage sensing means across the secondary winding which activates the parallel switches when the voltage level across the secondary winding circuit falls below a predetermined level and automatically deactivates the switches when the voltage level exceeds the predetermined value. Thus, the variable speed range for the motor can effectively be controlled by proper selection of resistance for the various resistors which will decrease the size of the components necessary in the remainder of the control system.

The power recovery system is specifically adapted for a multiple variable speed motor scheme with each motor driving a variable speed pump and being controlled by a separate power recovery system. The electronic control also incorporates electronic circuitry for selectively shorting the secondary winding of a given motor when the motor reaches a predetermined percentage of maximum speed to isolate the recovery system from the motor and provide a more effieient energy consumption system.

In multiple pump systems of this type, active or passive control valves are associated with the discharge lines to prevent reverse flow through the pump when it is shut down and also to maintain a static head pressure on the discharge side of the pump. According to one aspect of the present invention, the electronic control system incorporates controls that will operate the pump at a low forward speed to positively control the reverse flow through the pump caused by the static pressure head until the valve is closed.

The inverter section of the power control system includes thyristors that are sequentially commutated. The control logic for the inverter section and the solid state switch also incorporates a secondary gating system which is divorced from the primary gating system to provide an over voltage protection for the thyristors and also prevents gating from voltage transients of short duration. The secondary gating system produces positive gating at a fixed voltage, which is accurately controlled.

In high current systems, it is possible to use two or more parallel power recovery circuits with a single motor to increase the current capacity and the inventive electronic control circuitry incorporates a selector mechanism for selecting the highest current flowing in one of the power recovery circuits and controlling all of the power recovery circuits with the selected current.

The electronic control circuitry also incorporates a decode driver having an improved current foldback circuit.

BRIEF DESCRIPTION OF SEVERAL VIEWS OF DRAWINGS

FIGS. 6a–d are graphs showing the voltage and current conditions during normal operation of the circuit;

FIG. 17 is a control circuit for a pump having a control valve associated therewith; and, FIG. 17a is a graph showing the position of the limit switches illustrated in FIG. 17.

DETAILED DESCRIPTION

While this invention is susceptible of embodiment in many different forms, there is shown in the drawings and will herein be described in detail preferred embodiments of the invention with the understanding that the present disclosure to be considered as an exemplification of the principles of the invention and is not intended to limit the invention to the embodiments illustrated.

Figure 1:
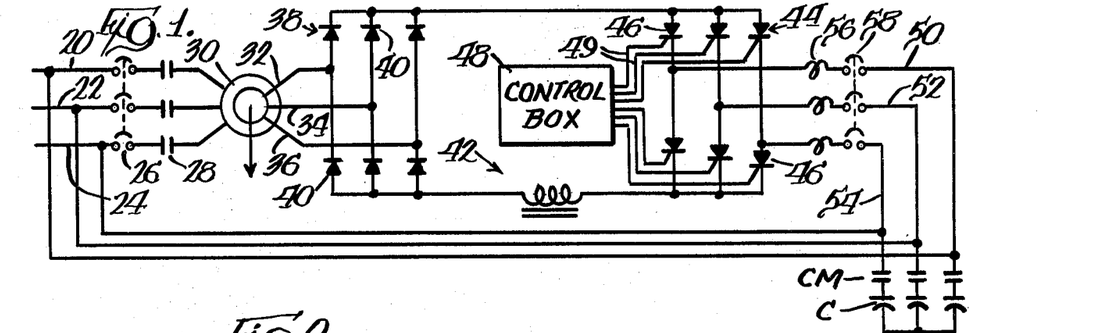
FIG. 1 of the drawings discloses a prior art type of adjustable speed control circuit with a power recovery control incorporated therein.

FIG. 1 of the drawings generally illustrates a prior art solid state circuit that has previously been utilized by the assignee of the present invention for operating an adjustable speed control large-horsepower A.C. variable speed motor of the constant torque type. The circuit illustrated therein consists of a three-phase A.C. power source connected to lines 20, 22 and 24 which have a circuit breaker 26 and normally open starter contacts 28 therein. Lines 20, 22 and 24 are connected to the primary winding of a wound-rotor motor 30 which also has a secondary winding connected through lines 32, 34 and 36 to a solid state rectifier bridge, generally designated by reference numeral 38. Rectifier bridge 38 consists of six diodes 40 where the motor potentials are converted from A.C. to D.C. power and are then fed into an inductive filter reactor 42. The filter reactor provides a buffer between the rectifier bridge 38 and the next drive component, which will be described later, and also is an integral part of the drive protective system for the circuit.

The next main component of the electric circuit is the phase-commutated inverter or converter 44 that inverts the D.C. power to an A.C. power. The phase-commutated inverter 44 is of the well-known type and comprising six thyristors generally labeled 46.

Firing or commutating of the thyristors is accomplished with suitable electronic control circuitry 48 which produces firing pulses through lines generally labeled 49 at intervals of approximately 60 electrical degrees with respect to the three-phase A.C. main lines 20, 22 and 24. The amplitude and polarity of the output of the inverter is controlled by varying the point in the electrical cycle where the firing sequence begins. The output is returned to main lines 20, 22 and 24 through lines 50, 52 and 54 having current transformers 56 and a circuit breaker 58 therein.

Firing or commutation of the thyristors may be performed by signals generated from a pulse generator disclosed in U.S. patent application, Ser. No. 147,415, in the name of R. W. Roof, et al, entitled PULSE GENERATING SYSTEM, filed of even date herewith and assigned to the assignee of the present invention, incorporated herein by reference.

Figure 7A:
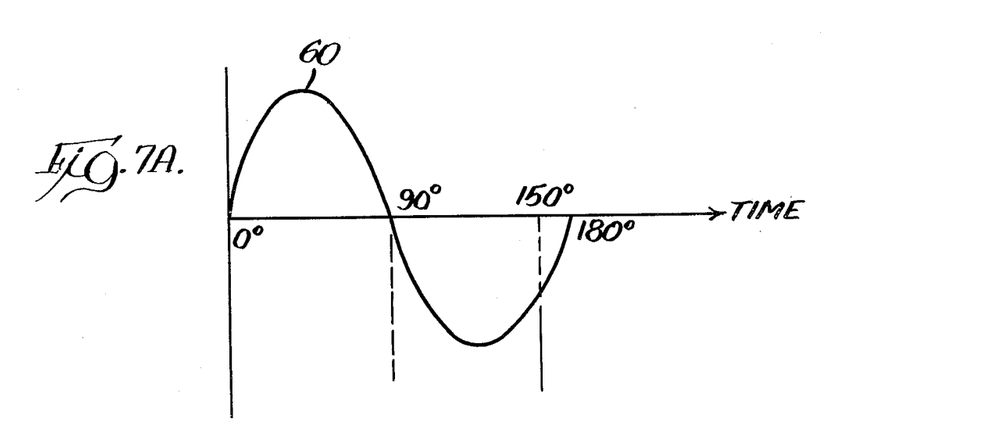
FIG. 7a is a graph illustrating one phase of a three-phase reference signal.
Figure 7B:
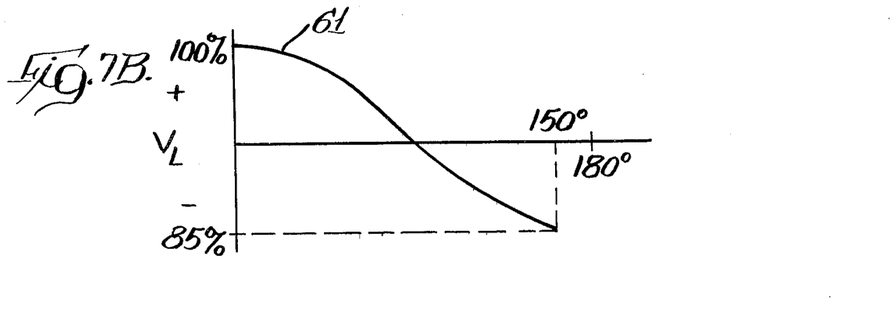
FIG. 7b is a graph plotting the percentage of positive and negative voltage across the load during a firing cycle.

Referring particularly to FIGS. 7a and 7b, curve 60 illustrated in FIG. 7a shows one phase of a three-phase reference signal for a one hundred eighty degree phase electrical cycle, while curve 61 in FIG. 7b shows the average positive or negative voltage that is generated across the load at any given point in time during the cycle shown in FIG. 7a. During the first ninety degrees, the average output voltage remains positive, while during the second ninety degree phase, the output voltage is negative. By delaying the firing sequence along the time reference in FIG. 7a, (firing angles) either a positive or negative average voltage will result at the beginning of the cycle. Theoretically, the firing angle may be delayed up to one hundred eighty degrees with respect to the start of the three-phase A.C. main lines. However, practical considerations limit the maximum firing angle delay to one hundred fifty degrees with respect to the start of the A.C. main line reference phase.

During the positive voltage portion of the cycle, the average D.C. current and voltage from the inverter 44 are both positive and the inverter is operated in a rectification mode. Thus, the power flow is through the inverter from the main lines 20, 22 and 24. However, for the remainder of the cycle, the average current through the inverter is positive while the average output voltage is negative and the inverter is operating in the inversion mode. Thus, the power flow through the inverter is from the load to the A.C. main lines and the inverter is used to recover power and return it to the main lines.

As explained above, there is a distinct firing sequence or commutation for the respective thyristors which must be followed for a particular incoming phase rotation of the three-phase main line power. In commutation, when a particular thyristor is fired, it will cause the current to cease to flow through a previously fired thyristor. This is necessary because, when a thyristor is fired, it will continue to conduct until the current through the thyristor drops to zero.

The problems with a system of this type is that, if there are transient electrical disturbances in the incoming feed lines, or ones which may be created externally, they may produce an interruption or disturbance in the firing sequence of the inverter which can cause a commutation problem. These effects are most prevalent when the inverter is operating in the inversion mode and any mis-commutation may produce a fault which may cause the inverter D.C. output polarity to reverse and place the inverter into a rectification mode. If such should occur, the thyristors which were previously in conduction at the beginning of the fault remain in conduction since the current through the thyristor cannot be forced to zero.

Figure 5:
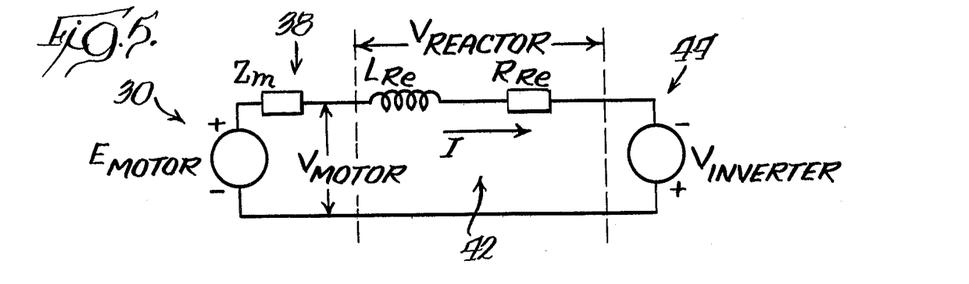
FIG. 5 is a schematic illustration of the power control circuit.
Figures 6, 6A, 6D:
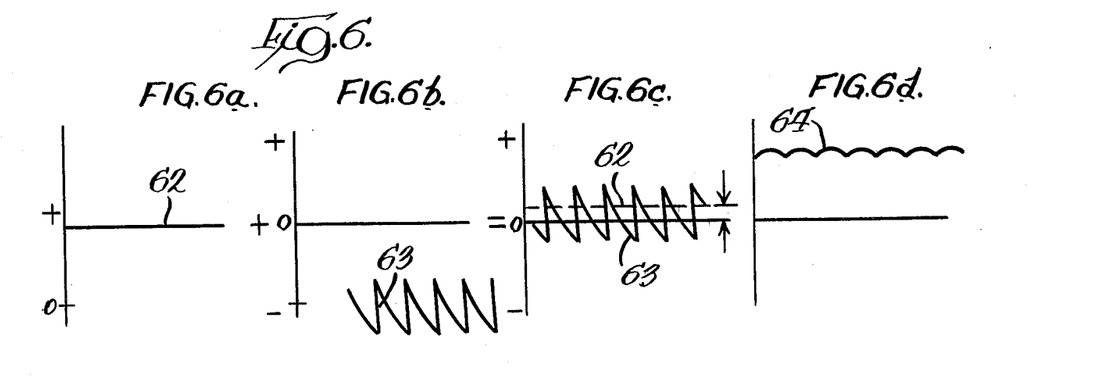

FIGS. 5 and 6 illustrate this phenomena in further detail schematically when operating under normal operating conditions. FIG. 5 discloses schematically the equivalent secondary circuit of the power recovery system illustrated in FIG. 1 including motor 30, rectifier bridge section 38, filter reactor section 42 and inverter section 44.

As illustrated in FIG. 6a, the average voltage, illustrated by line 62, of the motor is substantially constant and positive and may be equal to the voltage source since the impedance of the motor is very low. The average voltage of the inverter 44 is illustrated in FIG. 6b and is represented by a negative voltage represented by line 63 which results in a small difference in the voltage which appears across the filter reactor 42. These voltages combine, as illustrated in FIG. 6c, and a resultant current curve as illustrated in 6d by line 64, for normal operation of the system.

Figure 3:
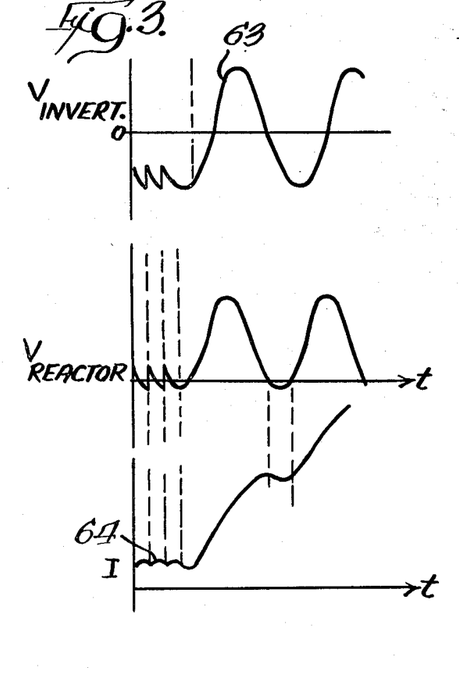
FIG. 3 is a graph showing the voltage and current plot when a fault occurs in the prior art system.

FIG. 3 represents the same graph and illustrates what occurs when a fault appears in the inverter circuit which will result in failing to deactivate a previously fired thyristor which will continue conducting current. When a fault occurs, the voltage output waveform 63 from the inverter suddenly changes, as illustrated in the upper portion of FIG. 3. Since the current through the inductor is proportional to the volt-seconds of the impressed voltage waveform, the current builds up rapidly as illustrated in the lower portion of FIG. 3. The current flow through the inductor also flows through the two thyristors that were fired just prior to the occurrence of the fault and will continue to conduct for a full cycle. During this full cycle, the current continues to build up as illustrated in FIG. 3 and will continue until such time as the circuit breaker 58 of FIG. 1 is ultimately tripped. The resulting stored energy in the system at such time can cause voltage transients which can easily destroy the inverter thyristors and the rectifier bridge diodes.

According to the primary aspect of the present invention, the above problem has been solved by incorporating additional circuitry into the power recovery control which will produce an automatically resettable high-speed electronic fault clearing means to control induced faults produced by transient electrical disturbances. An essential feature of the present invention is that a solid state switching means is incorporated into the rectifier bridge which, when activated, will cause the current through the filter reactor to drop to zero and thereby allow all of the thyristors in the inverter circuit to discontinue conduction.

A current level sensing means is electrically coupled to the output of the inverter and produces a signal whenever the current rises above a certain level. This signal is received by the electronic control which activates the solid state switch means and produces a low impedance current flow path in the secondary winding circuit which will produce a substantial voltage drop across the load in the secondary winding circuit.

Figure 2:
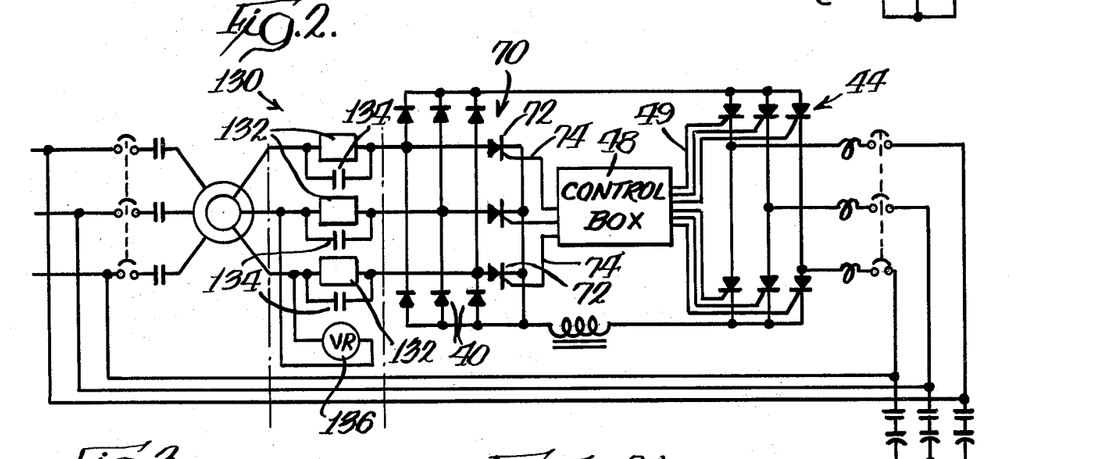
FIG. 2 is a circuit, such as illustrated in FIG. 1, modified in accordance with the teachings of the present invention.

More specifically, according to the present invention, the solid state switch means 70 consists of first, second and third thyristors 72 which substantially simultaneously receive firing pulses from a pulse generator in the electronic control 48 through lines 74, as will be described later. The pulse generator is activated by the current level sensing means or current transformers 56 that are respectively located in lines 50, 52 and 54. Thus, when the current from the output of the inverter 44 reaches a certain level which results from a fault in the inverter, a signal representative of a current increase above the preselected level will trigger the pulse generator and the pulse generator will then simultaneously send firing pulses to the three thyristors 72. Firing or activation of the thyristors 72 will produce a low resistance current flow path through thyristors 72 and lower diodes 40 and thereby will effectively reduce the voltage across the rectifier bridge to zero which will result in net zero volt-seconds across the filter reactor for a full cycle; that is, thyristors 72 will effectively short across the output side of the rectifier bridge.

Figure 4:
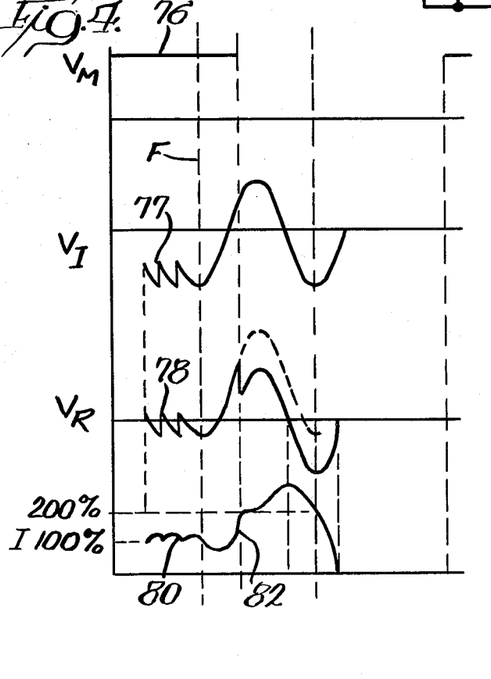
FIG. 4 is a view similar to FIG. 3 showing a graph of the voltage and current plot during a fault when the circuit is constructed in accordance with the present invention.

The synergistic results from the unique combination of elements may be most clearly understood by reference to FIG. 4 of the drawings which shows the various voltages of the motor, the inverter and the reactor respectively identified by reference numerals 76, 77 and 78 from the top to the bottom of FIG. 4. The lower most curve illustrates the current level during a normal operation along the lefthand side of FIG. 4 and is identified by reference numeral 80.

The following is the sequence of operation which will occur once a fault is initiated as illustrated at the point referenced by the dotted line F in FIG. 4. When a fault occurs, there will be a rapid build-up of current at the output of the inverter as illustrated by the portion 82 of the current graph on the lower portion of FIG. 4. When the current level reaches a predetermined amount greater than the normal current level illustrated at 80, the current transformers 56 will sense such rise in current level and will send a signal to the electronic control 48 which will immediately activate or fire all of the three shorting thyristors 72 by sending pulses through lines 74. As illustrated in the upper portion of FIG. 4, when the thyristors 72 are fired, the voltage of the motor secondary circuit drops to zero. At the same time, the gate signals to the respective inverter, thyristors 46 are inhibited by the pulse generator.

The filter reactor 42 is designed such that it can absorb one full cycle of voltage from the A.C. main lines without saturation, such as the reactor waveform 78 illustrated in FIG. 4. The fault current through the reactor builds or increases for the positive portion of the voltage waveform. However, when the voltage waveform reaches its peak, the fault current decreases to zero during the negative portion of the voltage waveform as the fault energy is transmitted to the main lines 20, 22 and 24. The result is that after one full cycle, the current in inverter 44 drops to zero and all of the thyristors in inverter 44 cease conduction which will result in the fault being cleared in the inverter section.

A predetermined time period after the fault occurs, the pulses to the shorting thyristors 72 are interrupted. A further predetermined time period after the fault occurs, the pulse generator resumes gating of the thyristors 46 in inverter 44 and the control system is then in normal operation.

With proper selection of the time sequence described above, an entire fault clearing sequence can be accomplished in a period of approximately 250 to approximately 300 milliseconds and during such small time span, the disturbance to the driven load is very slight. Furthermore, the inertia of the rotating components of the drive during this short time period will continue the rotation of the rotor and will result in only small speed fluctuations during this span.

Of course, it is entirely conceivable that a second fault might occur immediately after the first fault has been cleared, and the operation described above would be repeated. The system incorporates a protection device for preventing a number of such faults to occur within a given time span. For example, the electronics control which includes pulse generator incorporates electronics which will count the number of faults that occur in any given time span and if the fault clearing sequence is repeated more than a predetermined number of times during a predetermined time interval, the pulse generator will interrupt operation of the inverter to thereby protect the drive and motor against undue stress. For example, if the electronics of the system counts three fault clearing sequences in a time span of less than 60 seconds, the inverter is electronically locked out and must be manually reset by an operator, or by external supervisory apparatus.

An additional safety factor is the circuit breaker 58 incorporated into the lines 50, 52 and 54 leading back to the main lines 20, 22 and 24. In the event that the automatic fault clearing means malfunctions, the circuit breaker is designed so as to interrupt the circuit before any damage occurs to the thyristors and the diodes in the inverter circuit and the rectifier circuit.

In addition to the protective features described above for that portion of the circuitry that automatically clears faults without interrupting operation of the circuit, there are several additional advantages that are derived from the solid state switch means incorporated into the rectifier bridge circuit of the present invention.

More specifically, during normal operation of the circuit illustrated as prior art in FIG. 1 of the drawings, when the motor has been brought to full speed, the motor secondary current necessarily flows through the rectifier, the reactor and the inverter back to the main line. At full speed, there is virtually no energy returned to the main lines and there is a loss of energy through the various resistances in the inverter circuit and the return circuit.

Incorporating the solid state switch means 70 into the motor secondary circuit will allow the shorting thyristors 74 to be activated when the motor is brought to full speed. Once the motor attains full speed, the motor secondary current which normally flows through the rectifier 38, the filter reactor 42 and the inductor 44 is interrupted so that the current flow path is now from the motor secondary through the thyristors 72 into rectifier 40 and back to the motor secondary windings. Of course, since the motor is operating at full speed, there will be virtually no energy present in the motor secondary circuit. The inverter is therefore shut down to reduce the energy losses, which, in turn, results in better overall efficiency of the drive at the full speed.

A further benefit derived from the present invention is the fact that a significant savings can result in the amount of power factor correction apparatus that is necessary for installations wherein there are several motors that are operated in sequence.

Figure 8:
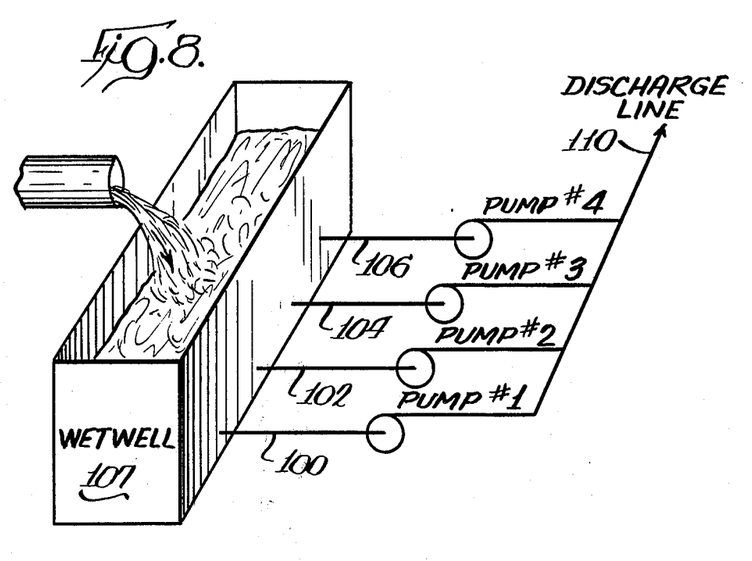
FIG. 8 is a schematic illustration of a system to which the present invention is specifically adaptable.

By way of example and not of limitation, one system to which the present invention is uniquely adapted is disclosed in FIG. 8 wherein a plurality of motors drive separate pumps, P1, P2, P3 and P4. These pumps are all connected through lines 100, 102, 104 and 106 to a well, such as a wetwell 107 of a sewage treatment plant. The outlets of all of the pumps P1–P4 are connected to a single discharge line 110.

In a set-up such as this, wherein multiple pumps are utilized for increasing the pumping capacity as the level of liquid in the well increases, the pumps are designed such that the first pump, P1, will become activated when the level in the well reaches a certain point. The operation of the pump, P1, will begin at a lower level, such as 50% of the maximum speed, and will be automatically increased as the level of the well increases. Thus, this pump will be operating at a variable speed until such time as it reaches full capacity at which time pump P1 will continue to operate at full capacity and the second pump, P2, will be energized if the level of liquid increases. While the first pump is operating at full speed, the second pump will be operated at the variable speed until it reaches its maximum speed and the third, P3, and fourth, P4, pumps are then sequentially activated until all pumps are operating at full speed.

In power recovery drive systems, as disclosed in FIG. 1 of the drawings and used in conjunction with several motors, there is a necessity for a power factor correction resulting from the ability of the inverter to shift the phase relationship of its A.C. main line current with a change in the firing angle. When the motor is operating at full speed, the secondary motor current in return lines 50, 52 and 54 connecting back to the A.C. main lines, lags the A.C. main line phase-to-neutral voltages by ninety degrees. As a consequence, the net power flow to the main lines 20, 22 and 24 from the inverter is purely a reactive power and it is usually necessary to correct this reactive power so that the energy transmission efficiency of the system is not impaired. This is usually accomplished by a bank of capacitors C (FIG. 1) that are switchable into the system when switches CM are actuated.

By utilizing the system described above in accordance with the present invention, the necessity for having a separate bank of capacitors for each of the control circuits is eliminated. Once the drive system reaches full speed, the inverter 44 is removed from the circuit and ceases to deliver energy back to the main lines. This means that the capacitor bank or power factor correction mechanism C can be switched over to the next motor which is at that time operating at a variable speed and reduces the necessary components for a complete system such as illustrated in FIG. 8. Thus, by providing a set of switches CM between each drive system and the single capacitor bank C, the capacitor bank can be used for all power recovery systems. Furthermore, when a single drive installation is used for accelerating a high inertia load to full speed, the use of the thyristors at full speed eliminates the need for any power factor correction apparatus.

Figure 9:
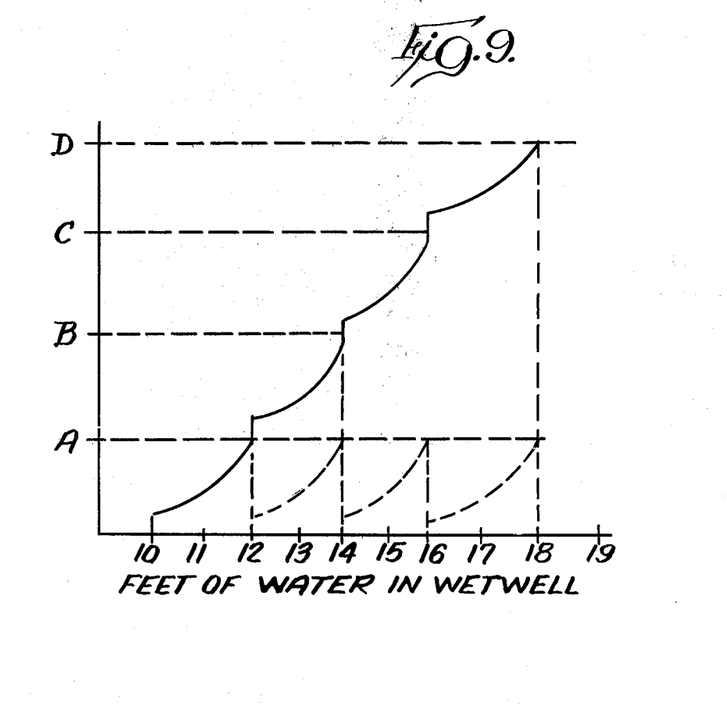
FIG. 9 is a graph showing the amount of reactive power generated in relation to the level of the liquid in the tank illustrated in FIG. 8 with and without incorporation of the present invention therein.

FIG. 9 shows a further graph which illustrates additional advantages that are derived by utilizing the solid state switch means or shorting thyristors in the control circuit and activating these shorting thyristors when the motor associated therewith reaches its full speed range. The solid line curve illustrated in FIG. 9 of the drawings shows the reactive power which must be generated as each of the four pumps reaches a maximum speed, while the dotted line curve illustrates the reactive power that is needed when the switch means or shorting thyristors are activated at the time each given motor reaches a maximum speed. From a comparison of the two curves, it will be appreciated that by shorting out the circuits when the motor reaches a maximum speed and cutting out the inverter section 44, the energy recovery system will result in reducing the reactive power generated to approximately one-fourth of that necessary without such activation.

In normal variable speed drive arrangements, the speed is varied from zero to 100% of the maximum speed range for a given motor. For many types of loads, particularly in utilizing motors for driving pumps, such as illustrated in FIG. 8 of the drawings, there is no need for varying the speed range from zero to 100% and reduced speed range systems can be utilized to extend the horsepower and voltage capability of a particular drive package. Presently, variable speed range is reduced by conventional electro-mechanical contactors in the circuit.

According to the present invention, the function of the electro-mechanical contacts is supplanted by incorporating a resistor section into the control circuit illustrated in FIG. 2. Resistor speed section 130 is installed into the lines 32, 34 and 36 between the motor secondary winding and the rectifier bridge 38. As illustrated in FIG. 2, the resistor section includes three similar resistors 132, respectively located in series with lines 32, 34 and 36. A normally open switch or contactor 134 is in parallel with each of the resistors 132 and a voltage sensitive relay 136, associated with normally open contactors 134, is connected between lines 34 and 36.

The resistors 132 are utilized in conjunction with solid state switch means 70, more specifically, shorting thyristors 72, to accelerate the motor from zero percent of speed to a predetermined percentage of the maximum speed dependent upon the load that is being driven. For example, the resistor section could remain in the circuit until the motor has reached a speed of approximately 50% of the maximum speed.

This is accomplished by producing pulses from pulse generator in electronic control 48 through lines 74 to activate the three thyristors 72 when the motor switch contacts 28 are closed, which will place the resistors 132 into the motor secondary circuit through the conducting thyristors 72. As the motor begins to accelerate, the voltage across the motor secondary circuit is sensed by the voltage relay and when the voltage is dropped below predetermined level, the voltage relay sends a signal to the pulse generator of the electronic control to interrupt the signal to the solid state switch means 70. At the same time, contactors 134 are closed and the resistors 132 are then bypassed. At this point, the inverter 44 becomes operational as described above and the system operates identical to the system described above in the controlled speed range of approximately 50% to 100% of the motor. If the drive speed should drop below the minimum control speed, the motor voltage will increase sufficiently to cause voltage relay 136 to activate the solid state switch 70, and open contacts 134 to place the resistors 132 into the circuit.

This unique arrangement on a power recovery drive system increases the horsepower capability of a particular drive package and allows for the use of a lower voltage power recovery drive system thereby reducing the overall cost of the recovery system. Furthermore, using the thyristors 72 during acceleration of the load from zero to a predetermined value also results in a considerable cost savings since the thyristors replace the electro-mechanical contactors which are normally incorporated into a circuit of this kind. Incorporating the resistor section 130 in conjunction with the solid state switch means 70 provides a significant degree of over voltage and over current protection to the motor and power electronics since the power electronics portion of the drive is automatically short circuited by activating thyristors 72 which allows the resistors to limit the current any time the secondary voltage exceeds the maximum voltage capability of the electronic portion of the drive.

The electronic control for the power drive system described above also incorporates several novel features for increasing the reliability of the overall system, reducing the energy losses, and providing protective features to insure that the system operates efficiently and reliably. As described more fully above, the electronic control incorporates a solid state switch means with resistors in the rectifier bridge section which are gated electronically when the speed of the motor reaches a predetermined maximum level which electronically locks outs the inductor and inverter portion of the drive system to reduce energy losses when the motor is operating at full speed.

Figure 10:
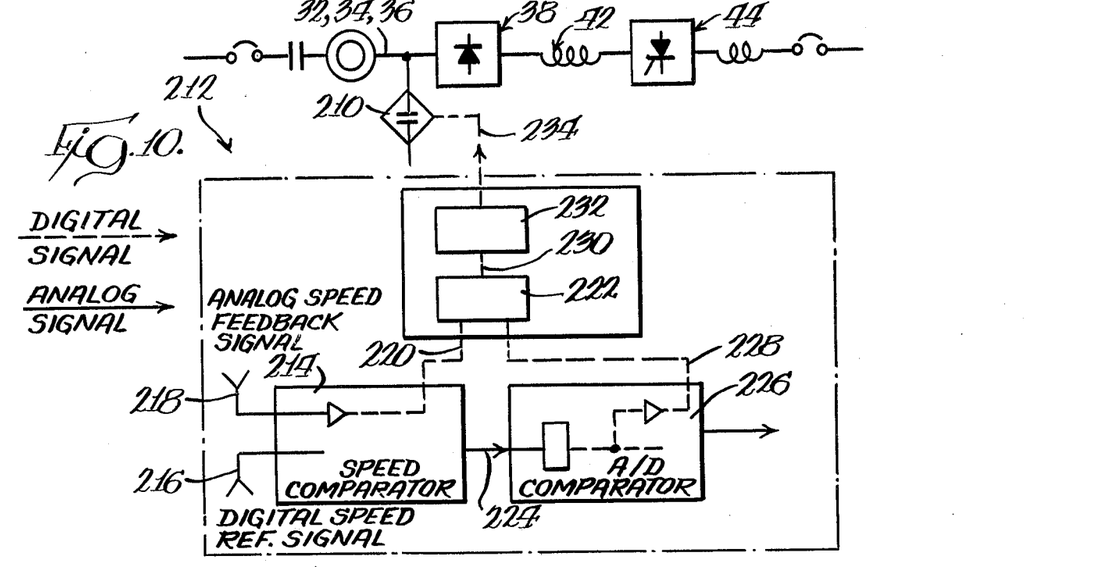
FIG. 10 discloses a control circuit for isolating the motor secondary winding from the power recovery circuitry when the motor associated therewith reaches a preselected speed.

FIG. 10 of the drawings discloses a schematic illustration of a novel circuit that can be incorporated into the electronic control which will automatically isolate the motor from the remainder of the drive circuit at the time the motor approaches maximum speed.

The circuit provides a means for selectively shorting the secondary winding of the motor by the use of a contactor 210 which is connected across lines 32, 34 and 36, and is activated by a circuit 212. Circuit 212 includes a comparator 214A which receives a speed feedback signal 218. The input signal 218 is compared to a predetermined reference signal 220 indicating the motor is operating at full speed and is fed to an And gate 222 whenever the speed feedback signal indicates that the speed of the motor is within a predetermined percentage of the fixed reference signal 216A. For example, when the motor is operating at more than 92% of its rated capacity, a full speed signal is fed through line 220 to And gate 222.

Comparator 214B produces an output signal 224 which is indicative of the inverter firing angle, to pulse generator 226. The pulse generator 226 is composed of an A/D converter 226B and a digital limiter 226A. The A/D converter produces an output signal used to control the firing angle of the inverter thyristors 46. (FIG. 2) The firing angle must be limited to approximately ninety degrees to prevent rectification operation. Digital limiter 226A prevents the firing angle from advancing past this point.

The digital limiter 226A produces an end stop signal 228 when the firing angle of the inverter thyristors is at a full advance point. End stop signal 228 is also fed into And gate 222. When both signals 220 and 228 are present, the And gate 222 produces an output signal 230 to a driver 232 which, in turn, sends a signal 234 to close contactor 210. Thus, the secondary terminals 32, 34 and 36 are shorted and rectifier 38, inductor 42 and inverter 44 are isolated from the motor secondary winding. The novelty of the circuit lies in the fact that the digital limiter which was required for system consideration is used to provide control logic for the solid state switch.

As indicated above, voltage relay 136 is used to introduce and remove resistors 132 from the secondary winding circuit and to gate shorting thyristor 72 to maintain a predetermined minimum speed for the motor. This allows the system to utilize components that have a lower voltage rating than would be necessary if the motor were operated throughout its variable speed range. In the system described above, the voltage relay senses the voltage level in the secondary winding circuit and energizes the solid state switch 70 when the voltage rises above a certain level and also simultaneously de-energizes contactors 134 to maintain the voltage in the inverter section 44 below a predetermined value.

According to a further aspect of the invention, the control system also incorporates a secondary passive gating system which is totally divorced from the remainder of the system and can operate independently to provide over voltage protection in the inverter and solid state switch section of the control system if voltage relay 136 does not function properly.

Figure 11:
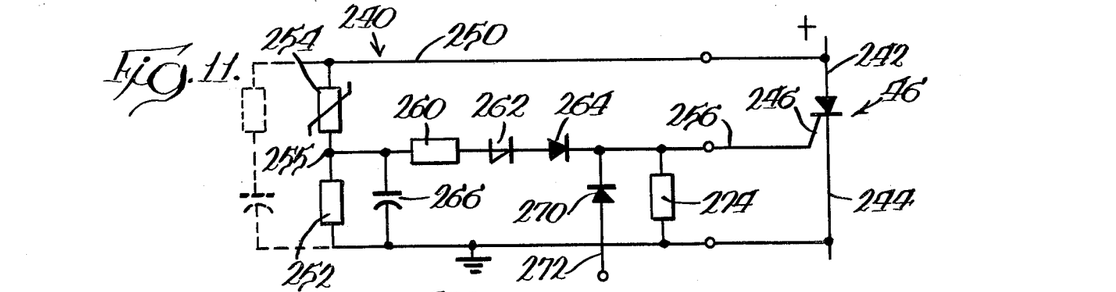
FIG. 11 discloses a secondary gating circuit for the thyristors in the power recovery circuitry.

FIG. 11 of the drawings discloses a gating system for gating the shorting thyristors 72 independent of voltage relay 136 in the event that the voltage relay malfunctions and the voltage in the inverter section 44 exceeds a certain level. The gating circuits of FIG. 11b is designed so that it is substantially independent of temperature changes and of different characteristics of different components. It also provides a positive gating at a fixed voltage to prevent any excess voltage from being developed in the inverter section, which could destroy some of the components therein.

As illustrated in FIG. 11a, circuit 240 is associated with thyristor 46 which has an anode 242 and a cathode 244 with a triggering or gating electrode 246. A line 250 connecting to the positive potential has a fixed resistor 252 and a varistor 254 therein. A line 256 leads from a junction 255 between resistor 252 and varistor 254 to gating electrode 246 of thyristor 46.

With the circuit so far described, when the positive voltage in line 250 exceeds a certain level, the "break-over" voltage for varistor 254, the varistor will begin to conduct and will produce current flow through resistor 252. When the voltage at the juncture 255 between varistor 254 and resistor 252 reaches a certain level, the thyristor 46 will receive a gate signal which will cause conduction from anode 242 to cathode 244. However, with such a circuit, a voltage transient disturbance may trigger the thyristor prematurely, before the voltage in line 250 or anode 242 is at the desired level.

According to one aspect of the invention shown in FIG. 11b, triggering or gating circuit 240 incorporates additional components which will prevent gating of thyristor 46 by low energy voltage transients and will insure a positive gating for high energy transients.

As illustrated in FIG. 11b, gating circuit 240 includes a resistor 260, a silicon unilaterial switch (SUS) 262 and a diode 264 in line 256 leading from juncture 255 to gating electrode 246. As is well-known, a silicon unilateral switch is a switch of the type which has a peak point voltage and is automatically triggered when the peak point voltage is reached. Thus, when the voltage at juncture 255 reaches a predetermined voltage, i.e., the voltage across resistor 252 is equal to the peak point voltage of SUS and the forward voltage of diode 264, SUS 262 is triggered and a gating signal is received by thyristor 46. This insures that a more positive gating signal is received and there is a more sharply defined energy triggering point. It also is less dependent on the gate trigger current and the forward gate voltage of thyristor 46, both of which vary in response to operating temperature and part-to-part variances.

The gating circuit also has a capacitor 266 connected between juncture 255 and resistor 260 as well as a further diode 270 in incoming gate signal line 272 and a further resistor 274 between gating electrode 246 and ground. By having capacitor 266 in the circuit, energy is absorbed from the transient and used to insure sufficient gating current when the thyristor is gated. Diode 264 is placed in the circuit to increase the reverse voltage blocking capability of SUS 262 and resistor 260 limits the discharge current.

The gating circuit may also include a snubber circuit 280 consisting of a series connected resistor 282 and capacitor 284 in parallel with thyristor 46. The snubber circuit controls the maximum rate of change of voltage and the peak voltage across the thyristor when a step voltage is applied to gate electrode 246.

In the power recovery drive system described in connection with FIG. 2 above, the rotor current is rectified, smooth and inverted to flow into the A.C. main lines to conserve energy. The current path to the return line is monitored and, if the current is excessive, the thyristor inverter section is controlled to limit the magnitude of the current.

On extremely high current capacity systems, it is possible to incorporate two or more identical rectifier-reactor-inverter units in parallel with a single motor output winding circuit to increase the current capacity for the unit. Theoretically, when this is accomplished, the current flow from the secondary winding circuit of the motor is equally shared with all of the parallel units that are associated with each motor. However, in practice it is impracticable to be able to exactly duplicate two such units which have the same current and resistance characteristics. Thus, it becomes necessary to monitor each of the current flow paths leading from a single motor and to select the larger of the current signals so that the circuit having the greatest current flow is monitored and can be controlled.

Figure 12:
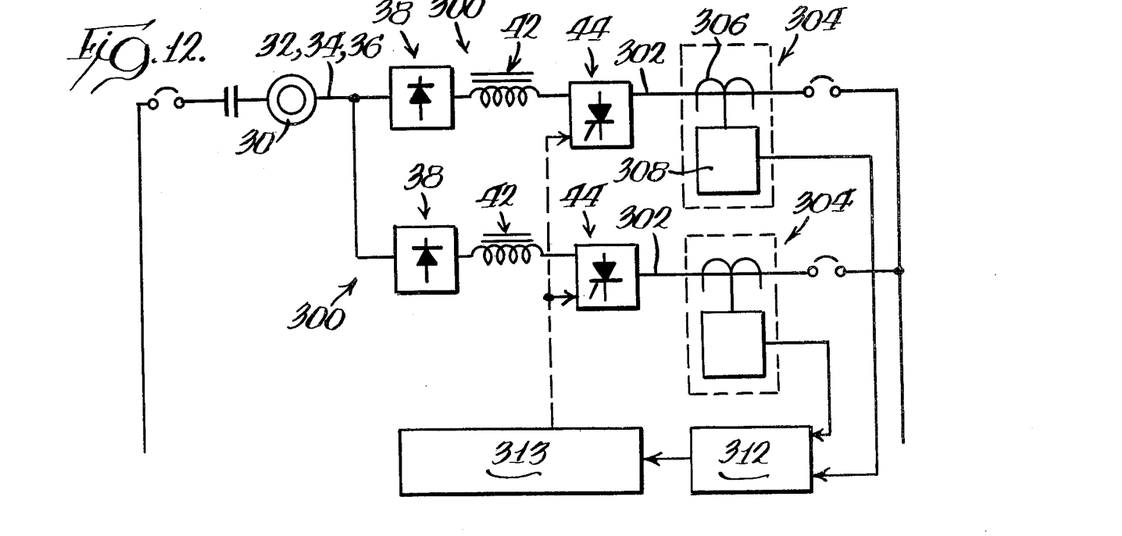
FIG. 12 shows a schematic circuit having parallel power recovery circuits coupled to a single motor.

According to a further aspect of the present invention, the power recovery drive system, when used with parallel rectifier-reactor-inverter circuits with a single motor has a monitoring system incorporated therein which will automatically elect the circuit with the highest current flow and will control all of the parallel circuits with a single output from the monitor control. The system for accomplishing this end is illustrated in FIGS. 12 and 13 and includes substantially identical parallel circuits 300 leading from the secondary winding circuit including lines 32, 34 and 36 and each parallel circuit has a rectifier bridge 38, an inductive reactor 42 and an inverter 44 in series therein.

The output current from each of the inverters is delivered through line 302 and the level of current flow is detected by a current sensor circuit 304 which produces D.C. voltage that is proportional to the current flow through the power electronic or circuit 300. This may be accomplished by utilizing a current transformer 306 which senses current flow in line 302 and a current to voltage transducer 308 which produces an output through line 310 to an input of a signal amplitude monitoring circuit 312 which monitors a plurality of signal inputs and selects the highest amplitude signal received by the circuit 312 and delivers a single output signal to a drive electronics unit 313, which controls the inverters.

Figures 13, 14, 15:
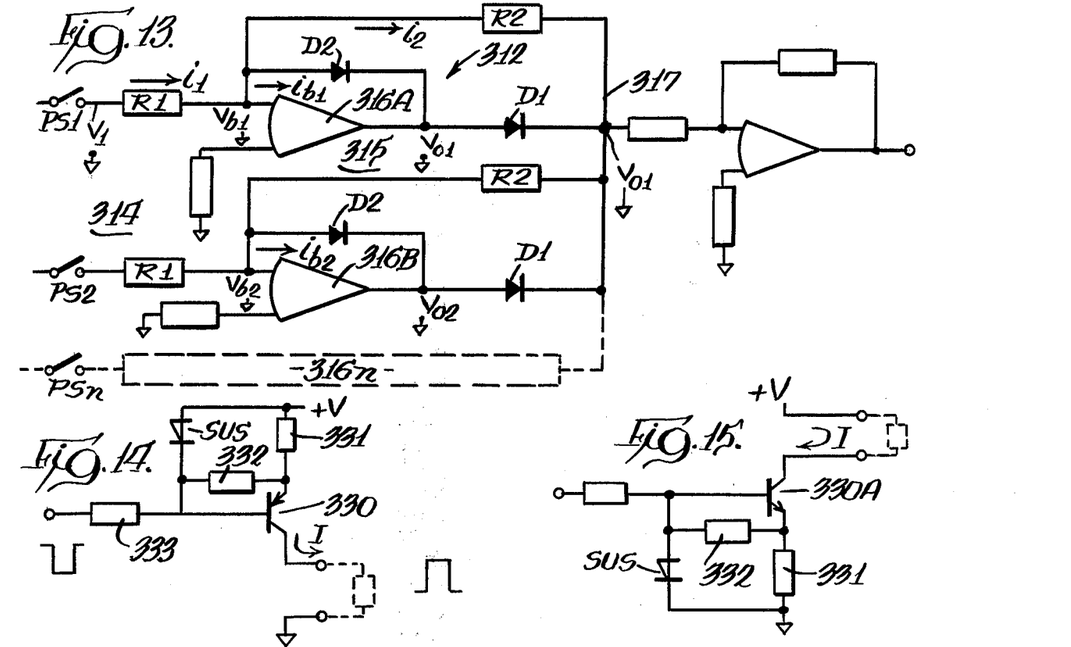
FIG. 13 shows a control circuit for selecting the highest current flow in the respective parallel circuits of FIG. 12.
FIG. 14 is a schematic showing a decode driver having an improved current foldback circuit.
FIG. 15 is a schematic similar to FIG. 14 showing a modified current foldback circuit.

Referring to FIG. 13, which shows the monitoring circuit 312 consisting of two stages, the first stage 314 being a group of precision switches generally labeled PS, which effectively comprise a computation network. The second stage 315 is comprised of an operational amplifier (op amp).

The operation of the precision switch stage 314 may be explained as follows:

The output voltage $V_{01}, V_{02} \ldots V_{0n}$, respectively of each op amp 316A, 316B ... 316n, will increase as long as its respective input voltage $V_{b1}, B_{b2} \ldots V_{bn}$ is positive. Assume precision switch PS1 has a voltage $V_1$ impressed thereon, and assume the input current $i_1$ to the op amp 316A is zero (0), consider the following relations:

$$i_{b1} = 0$$

where $i_{b1}$ is the current flowing through op amp 316A, and, $$i_1 = i_2$$

where $i_1$ is the input current to op amp 316A, and $i_2$ is the current through resistor R2.

Therefore, the following applies:

$$(V_1 - V_{b1}) = (V_{b1} - V_{01})$$

Where
$V_1$ is the input voltage to op amp 316A
$V_0$ is the output voltage (from common line 317 to ground)
$R_1$ is the input resistance
$R_2$ is the resistance of resistor $R_2$
Solving for $V_{b1}$ $$V_{b1} = V_1 \cdot R_2/(R_1 + R_2) + V_{01} \cdot R_1/(R_1 + R_2)$$

Assume for the purpose of discussion that $R_1 = R_2$, then $V_{b1} = \frac{1}{2}(V_1 + V_{01})$.

Assuming further that all the diodes are ideal and that $V_0$ is a positive value and $V_1$ is a negative value. Voltage $V_{b1}$ will be positive if $V_1$ is less than $V_0$ and, as a consequence, $V_{01}$ will swing towards negative saturation. Coversely, $V_{b1}$ will be negative if $V_1$ is greater than $V_0$, and $V_{01}$ will swing toward positive saturation.

The output voltage ($V_0$) will be equal to the larger of $V_{01}, V_{02} \ldots V_{0n}$ since only one of the diodes $D_1, D_2 \ldots D_n$ can be forward biased. (The other diodes will be reverse biased.)

Therefore: $V_0$ will equal the greater of $V_{01}, V_{02} \ldots V_{0n}$; and the greater of $V_{01}, V_{02} \ldots V_{0n}$ will be controlled by the greater of $V_1, V_2 \ldots V_n$.

Note that the operational amplifier stage 315 simply isolates the output of each precision switch PS1, PS2 ... PSn and provides drive capability through amplifier 319 to the drive electronics 313.

Thus, the current monitoring circuit provides a single output voltage that is equal to the larger of the various input voltages. This output signal is fed to the drive electronics 313, FIG. 12.

FIG. 14 shows a current foldback circuit which is part of the output drive stage of a decode/drive operating in conjunction with the pulse generator disclosed in the above-identified application, Ser. No. 147414 filed May 5, 1980 to produce an output for gating the main power thyristors of the adjustable speed drive.

Output drive stages as known in the prior art have been protected against short circuits by either inserting a current limiting resistor in series with the output or by providing current foldback. Current foldback constitutes sensing the current and reducing it to a smaller value if it exceeds a predetermined setpoint. The series resistor scheme, while being the simplest, ofter requires physically larger resistors due to increased power dissipation. The disadvantage of prior art foldback schemes is that, usually, the sensing and foldback circuits are complex.

The present invention discloses a circuit which eliminates the large current limiting resistors by implementing an improved current foldback circuit. The basic output drive and foldback circuit consists of an output PNP type transistor 330, a sensing resistor 331, base emitter resistor 332, base drive resistor 333, and voltage sensing switch (Silicon Unilaterial Switch) SUS.

Current foldback is provided by resistor 331 and switch SUS. Resistor 331 is used as a current sensing resistor and switch SUS is used as a voltage sensing and foldback device. The characteristics of the SUS device are such that the SUS initially appears as a high impedance until the voltage across it reaches its peak point voltage (approximately 8 V). At this point, the SUS switches to a low impedance with approximately 1.5 volts forward voltage drop. The SUS will remain in this state as long as approximately 1 ma of current is maintained. When the base-emitter voltage of transistor 330 and the voltage across resistor 331 reaches the peak point voltage of switch SUS, it will conduct, thereby shunting the base drive to transistor 331. This will reduce the output current I to the load.

The peak foldback current is determined as follows:

$$I_{peak} = \frac{V_{peak} - V_{BE\,330}}{\text{Resistance 331}}$$

Where $V_{BE\,331}$ is the base to emitter voltage, the output current I is then reduced to the following:

$$I_{foldback\,output} = \frac{V_{F\,SUS} - V_{BE\,330}}{\text{Resistance 331}} - I_{base\,drive\,330}$$

Where $V_{F\,SUS}$ is the forward voltage drop of the SUS switch, I base drive 330 can usually be neglected simplifying to $$I_{foldback\,output} = \frac{V_{F\,SUS} - V_{BE\,331}}{\text{Resistance 330}}$$

using typical values of
$V_{peak\,SUS} = 8$ volts
$V_{BE\,330} = 0.7$ volts
$V_{F\,SUS} = 1.5$ volts
The ratio of foldback is $$\frac{I_{foldback\,output}}{I_{peak\,output}} = \frac{\frac{V_{F\,SUS} - V_{BE\,331}}{\text{Resistance 331}} - \frac{V_{peak\,SUS} - V_{BE\,330}}{\text{Resistance 331}}}{\frac{V_{F\,SUS} - V_{BE\,330}}{V_{peak\,SUS} - V_{BE\,330}}} = \frac{1.5\,V - .7\,V}{8\,V - .7\,V} = .11$$

Therefore, the current can be reduced to approximately 11% of the foldback setpoint, providing protection against short circuits.

The circuit of FIG. 15 shows a modification of the circuit of FIG. 14, and is applicable where it is necessary for the output to sink current. In FIG. 15, output transistor 330A corresponding to transistor 330 in FIG. 14 is changed to an NPN transistor and the circuit components connected in accordance with the change in polarity. The circuits of both FIGS. 14 and 15 have the main advantage of providing accurate current foldback with the addition on only a sensing resistor and an SUS device.

As indicated above, the power recovery control system of the present invention is particularly adapted for operating a plurality of pumps which are sequentially operated to pump liquid from a single source to a single discharge, as illustrated in FIG. 8 of the drawings. With a plurality of pumps operating between a single source and a single discharge, it becomes necessary to prevent back flow through the pump when the pump is not operating.

The most common type of system incorporates passive valves such as check valves which are automatically opened when the pump develops sufficient pressure to force the valve to open and close any time there is an attempted reversal of flow from the discharge to the suction side of the pump. Thus, the valve is responsive to the flow and pressure of the liquid being pumped. Another type of valve that is utilized may be considered as an active valve which is motor operated and requires actuating signals to initiate opening and closing of the valve.

With either type of valve, the most common failure is that the valve will remain open when commanded to close either by an actuating signal or a fluid pressure signal. Such a malfunction is particularly serious when utilizing a plural pump system of the type illustrated in FIG. 8. As will be appreciated and is more fully explained above, each of the pumps illustrated in FIG. 8 is operated between a capacity of 50% to 100% of maximum and remains operating at its maximum capacity while a second or subsequent pump is being operated at a variable capacity.

Figure 16:
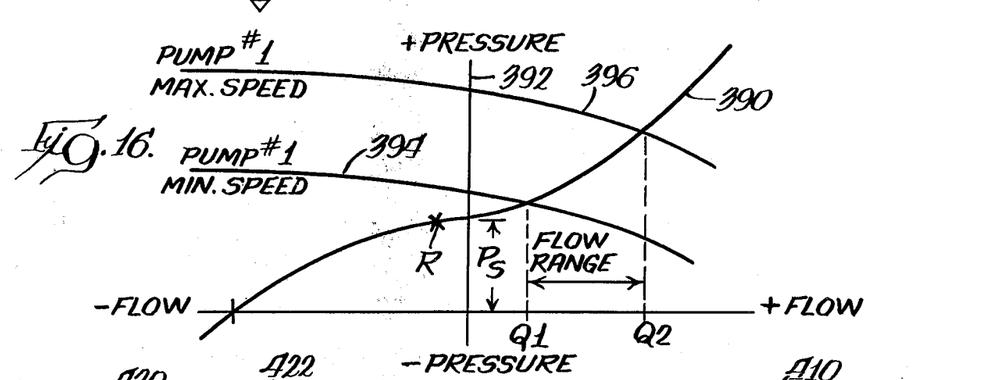
FIG. 16 is a graph showing a pressure v. pump flow curve.

In multiple pump systems of the type disclosed in FIG. 8, the systems are designed to have a positive pressure or static head pressure on the discharge side of the pump. For example, the graph illustrated in FIG. 16 is a plot of the pressure versus flow curve, indicated by reference numeral 390. The line 390 intersects the line of zero flow 392 on the positive pressure side and indicates a static head pressure of $P_s$.

The graph also illustrates two additional curves 394 and 396 which, respectively, show the minimum and maximum output pressures of a given pump at minimum and maximum speeds for a given pump. The points of intersection Q1, Q2 of curves 394 and 396 with curve 390 define the flow range for a given pump.

In order to have complete control of pumping capacity of a multiple pump system throughout the flow range, the minimum pump flow Q1 is designed to be very close to zero flow 392. Thus, if a given valve associated with a given pump does not close properly after a pump is shut down, the static head pressure on the discharge line will produce a reverse flow through the pump.

While systems have been developed for detecting a malfunction in a valve control system, either on a passive or an active valve, most of these systems only detect and display the valve failure without taking any corrective action when such valve failure is detected. For example, an active valve system wherein a motor controls the opening and closing of the valve, if the valve remains open, such as by an obstruction within the valve, the pump will continue to operate even after being commanded to shut down because the valve must be closed before the pump motor is de-energized.

If such events should occur in a multiple pump system of the type disclosed in FIG. 8, the pump could quickly empty the wetwell and be operating without pumping any liquid which would destroy the components.

Alternatively, if a passive valve, such as a check valve, becomes stuck in an open position, such as when debris prevents it from closing, the consequences are even more serious. When such a condition occurs, the pump will shut down and the valve will remain open which will result in a reverse flow from the discharge line through the opened valve and the pump and back into the wetwell. In centrifugal pumps, for example, a reverse flow through the pump will result in the pump impeller spinning backwards and, since there is very little pressure drop across the reverse flow pump, the motor, pump and drive shaft may be subjected to very high reverse rotational speed which could cause destruction of the components therein. A further problem is that if the pump then is signaled to be activated, while it is rotating in the reverse direction, applying power to the motor could cause severe torque and current surges which could damage the pump, motor, controller and the drive shaft.

The problem becomes even more acute when a plural pump arrangement is utilized since an opened valve will produce a reverse flow from the discharge line back into the well which will increase the level of the well and will signal for an additional pump to become operative. The additional pump will then be pumping into the discharge line which will also flow through the opened valve back into the well.

According to a further aspect of the present invention, the power recovery drive system for a multiple pump motor also incorporates a valve control scheme which provides complete control of both active and passive valves and prevents or limits reverse flow through any one of the pumps even when a valve fails to close. More specifically, the control system of the present invention incorporates a control mechanism which will operate the pump at a very low forward speed, sufficient to allow for a small amount of reverse flow in the event of valve failure, and thereby prevent any large amount of flow through any one of the pumps.

Figures 17, 17A:
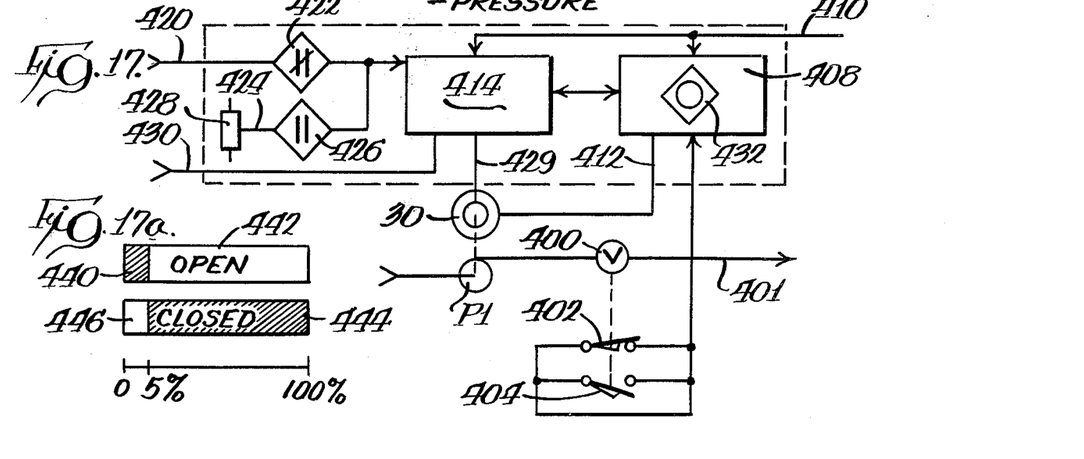

Referring to FIG. 17, a valve 400 is located in discharge line 401 from a pump such as pump P1 (see FIG. 8) which is driven by motor 30. Valve 400 may either be an active valve or a passive valve and is operatively connected to two limit switches 402 and 404. Limit switches 402 and 404 form parts of circuits connected by line 406 to control section 408 which forms part of the power recovery system illustrated in FIG. 2. Control section 408 has a power input line 410 connected thereto and an output line 412 connected to motor 30. Control section 408 is also operatively connected to a drive speed regulation section 414 that also forms part of the power electronics which also has input line 410 connected thereto. A drive speed reference signal 420 has a normally closed contactor 422 therein leading to drive speed regulation section 414. A parallel line 424 has a normally open contactor 426 therein and is connected to a shut down speed reference signal 428 and has an output signal through line 429 to motor 30. A motor start-stop command signal is received by drive speed regulation section 414 through line 430 while contactors 422 and 426 are opened and closed by a relay 432 in control section 408.

As illustrated in FIG. 17a, limit switch 402 is designed to be open a majority of the sequence between the valve fully closed position and the valve fully opened position while limit switch 404 is normally closed throughout the majority of this sequence. The shaded portion 440 of graph 442 indicates that switch 402 is closed for a predetermined percentage of movement from the closed to the open position, such as 5% of such movement. Also, graph 444 for switch 404 shows that switch 404 is open the same predetermined percentage of movement, identified by reference 446 and is closed the remainder of the time.

With the circuit described, when a signal is received through line 430 to control section 414 to start the motor for a given pump, the control logic first checks to see that limit switch 402 is closed which is indicative that the valve is at least 95% closed. If the valve is closed, relay 432 in control section 408 is de-energized and closes contactor 422 while opening contactor 426.

Closure of contactor 422 will introduce the normal speed reference signal to the speed regulation electronics 414. A control signal on line 430 will energize the motor 30 through line 429 and the motor will begin to accelerate. If the valve is an active valve, such as a motor operated valve, the signal will also be supplied to valve 400 to cause the valve to open. The valve will thus be moved to the fully opened position either by the pressure of the fluid being pumped through pump P1 or by the operation of a motor associated therewith.

When a control signal is received through line 428 to command the motor 30 to stop, relay 432 is energized which will open contactor 422 and close contactor 426 to introduce the shut down speed reference signal 428 into controller 414. The shut down speed reference signal 428 will condition the operation of the motor 30 for a slow forward speed which will allow a small reverse flow through the pump while still having the motor and pump operating in the forward rotational direction. For example, the reverse flow position could be as illustrated by the point R in the graph shown in FIG. 16. The motor 30 and pump P1 will continue to operate until the valve is approximately 95% closed at which time limit switch 404 will be opened and the pump motor will be commanded to shut down.

Thus, with a very limited additional circuitry, consisting of two limit switches, and a slow (shut down) speed reference signal, the valving sequence can be positively controlled and any substantial amount of reverse flow will be prevented. Of course, if the motor continues to operate at the lower speed dictated by the signal 428, a further signal could be activated to provide an indication that there is a malfunctioning valve in the control system so that operator intervention could be commanded.

In summary, the present invention provides simplified and more efficient system for automatically correcting faults in a power recovery control circuit which may result from transient electrical disturbances. The system also reduces the requirements for the overall circuit by incorporating a resistor section into the system which will automatically accelerate the motor from a zero speed to a predetermined minimum speed whereupon the circuit becomes operational to be variable in range from that point to the full speed range of the motor rating. The control circuit incorporates numerous additional components that increase the reliability for operation without attendants. It also includes several energy saving features which maximizes the energy efficiency of the overall system.

We claim:

1. In a power recovery drive system for a wound-rotor motor driven from A.C. main lines, said power drive system providing automatic fault clearance of transient electrical distrubances, said motor including primary and secondary winding means, said primary winding means connected to the A.C. lines, rectifier bridge means connected to receive the output from said secondary winding means and provide a D.C. voltage, inductive reactor means serially connected to the output of said bridge means, a solid state inverter connected to receive said D.C. voltage from said rectifier means and provide an A.C. voltage output, means coupling the output of said inverter back to said A.C. lines, the improvement comprising, in combination, solid state switch means connected to said secondary winding means and to said rectifier bridge means for effectively shorting said secondary winding means when actuated; current level sensing means electrically coupled to the output of said inverter and sensing the increase of inverter current resulting such as from a fault and providing a signal representative of a current increase above a preselected level; and control means responsive to said sensing means signal to actuate said solid state switch means to short across said rectifier bridge means and cause the D.C. voltage to drop, said reactor being effective to absorb and buffer at least one full cycle of A.C. voltage without saturating whereby the fault energy is dumped back into the A.C. main lines enabling the reactor current to drop to substantially zero and allowing the fault to clear.

2. A power recovery drive system as defined in claim 1, in which said motor is a variable speed motor having a rated speed and in which said control means includes means responsive to the output of said inverter for actuating said solid state switch means for effectively isolating said inverter from said secondary winding means when the speed of said motor reaches a predetermined level.

3. A power recovery drive system as defined in claim 1, further including a resistor section between said secondary winding means and said rectifier bridge, and means in said resistor section for placing resistors in said section between said secondary winding means and said rectifier bridge means in response to fluctuations in voltage in said secondary winding means with respect to a predetermined value.

4. A power recovery drive system as defined in claim 1, in which said A.C. main lines include a three-phase power source and said solid state inverter which converts said D.C. power to an A.C. power output having a frequency and voltage corresponding substantially to A.C. main lines.

5. A power recovery drive system as defined in claim 4, in which said solid state switch means includes a thyristor coupled to each phase of said power source and said control means includes a signal generator for substantially simultaneously supplying a firing pulse to each of said thyristors coupled to each phase so that each phase is shorted across said rectifier bridge means.

6. A power recovery drive system as defined in claim 5, in which each phase of said power source has a resistor in series between said secondary winding means and said rectifier bridge means and each resistor has a switch means associated therewith, further including voltage sensing means across said secondary winding means for activating said switch means when the voltage level across said secondary winding circuit falls below a predetermined value and de-activating said switch means when the voltage level exceeds said predetermined value.

7. A power recovery drive system as defined in claim 6, in which said control means includes means for sensing the predetermined value at which said motor is essentially at a maximum speed and means in said control means for activating each of said thyristors simultaneously so that said solid state inverter is isolated from said secondary winding circuit.

8. A power recovery drive system as defined in claim 1, further including counter means in said control means for counting the number of faults and de-activating said system when there are a predetermined number of faults in a given time span.

9. A power recovery drive system as defined in claim 4, in which said solid state inverter includes a plurality of thyristors serially commutated by said control means, further including means in said control means preventing commutation of said thyristors when an excess current level is sensed by said current level sensing means.

10. A power recovery drive system as defined in claim 1, in which there are a plurality of drive systems each operatively coupled to a variable speed motor driving a pump having an inlet and a discharge with a valve in said discharge and a static head pressure in said discharge, further including control circuitry for driving said motor at an idle speed wherein the output pressure of said pump is slightly less than said static head pressure to produce a controlled reverse flow through said pump, and valve position sensing means for sensing the position of said valve and de-activating said motor when said valve is in a predetermined position.

11. A power recovery drive system as defined in claim 1, in which said motor drives a variable speed pump having a liquid inlet and discharge with a valve in said discharge closable to maintain a predetermined static head pressure in said discharge, sensing means for sensing the position of said valve, motor control means including signal generating means for operating said motor at a forward speed wherein the pump output pressure is less than said static head pressure, said sensing means interrupting said signal generating means when said valve reaches a predetermined position.

12. A power recovery drive system as defined in claim 11, in which said valve is a passive valve movable between open and closed positions by liquid pressure in said discharge line and in which said predetermined position is a position corresponding substantially to said closed position to prevent significant reverse flow of liquid through said valve and said pump.

13. A power recovery drive system as defined in claim 11, in which said valve is an active valve positively driven between open and closed positions and in which said predetermined position is a position corresponding substantially to said closed position to prevent significant reverse flow through said valve and pump.

14. A power recovery drive system as defined in claim 1, further including contactor means in said secondary winding circuit between said rectifier bridge means and said motor, and circuit means for monitoring the speed of said motor and producing an output signal when said motor reaches a predetermined speed to close said contactor means and effectively short said secondary circuit.

15. A power recovery drive system as defined in claim 1, in which said solid state inverter includes a plurality of thyristors each having a gating electrode and said control means includes signal generating means for gating said thyristors, further including a secondary gating circuit for each thyristor and substantially independent of said signal generating means, each secondary gating circuit including sensing means for sensing the voltage across a thyristor, and a circuit interconnecting said sensing means and an associated gating electrode, said circuit having a unilateral switch actuateable in response to sensing a peak point voltage to energize said gating electrode.

16. A power recovery drive system as defined in claim 15, further including capacitor means in said circuit for absorbing transient voltage pulses of short duration.

17. A power recovery drive system as defined in claim 16, further including a series connected capacitor and resistor in parallel with said sensing means for controlling the voltage change across an associated thyristor.

18. A power recovery system as defined in claim 1, further including circuitry for selecting that input voltage having greater amplitude from a group of distinct input voltages and providing an output voltage corresponding thereto, comprising in combination, a plurality of precision switch means, a plurality of operational amplifiers each connected to receive an input voltage through a respective switch means, a plurality of diode means each connected in series with the output of a respective amplifier and said diode means connecting to a common output line, and a resistance means connected in parallel with each of said amplifiers, whereby the maximum amplitude voltage connected through the respective amplifiers provides a voltage which forward biases the respective diode means to provide an output voltage proportional thereto, and said output voltage reverse biasing said other diode means to inhibit any voltage signal provided by its respective amplifier.

19. A power recovery system as defined in claim 1, further including circuitry for providing a current foldback circuit for limiting current through an associated load which circuit utilizes relatively small resistors, comprising in combination, a three electrode transistor, a first resistor connected in series with the control electrode of said transistor and a signal coupled through said first resistor to said control electrode, a second resistor connected to a current carrying electrode and effecting load current flow therethrough, a third resistor connected from the current carrying electrode to said base electrode, a silicon unilateral switch connected across said second and third resistors whereby said second resistor functions as a current sensing resistor and said silicon unilateral switch functions as a voltage sensing and foldback device whereby at a certain level of current flow through said second resistor, said switch will conduct thereby shunting the control signal to said transistor and causing said transistor to stop conducting and thereby reduce the current to the associated load.

20. In a drive system for a variable speed A.C. motor driven from a three-phase A.C. power source, said motor having primary and secondary windings and with source connected to said primary winding, solid state rectifier bridge means connected to an output of said secondary winding to produce a D.C. power, a solid state inverter connected to receive said D.C. power and including thyristors sequentially commutated to provide an A.C. power output which is fed back into the A.C. line connections with said power source, an inductive reactor connected intermediate said bridge means and said inverter, said inverter connected to couple power back to said power source, control means for sequentially commutating said thyristors, solid state switch means in said rectifier bridge means connected to said control means, and current level sensing means coupled to the output of said solid state inverter and said control means and producing an output when the current level reaches a predetermined value, said control means energizing said switch means to produce a low impedance current path in said rectifier bridge means and cause said D.C. voltage to drop to a substantially zero value, and thereby enable automatic clearing of said fault.

21. A drive system as defined in claim 20, further including additional means in said control means for energizing said switch means when said motor is operating at substantially maximum speed so that said inductive reactor and said inverter are electronically locked out.

22. A drive system as defined in claim 21, further including contactor means in said secondary winding and means in said control means for producing an output signal to close said contactor means when said motor is at a predetermined speed and the voltage in said inverter is at a predetermined value to effectively short said secondary winding and isolate said rectifier bridge means from said secondary winding.

23. A drive system as defined in claim 20, in which said control means includes over voltage protection means for each thyristor, said over voltage protection means including sensing means for sensing the potential across a thyristor, and a circuit between said sensing means, and said thyristor, said circuit including a silicon unilaterial switch actuated in response to sensing a peak point voltage to trigger said associated thyristor.

24. A drive system as defined in claim 20, further including at least one circuit in parallel with said bridge means, inductive reactor and inverter and having series connected bridge means, an inductive reactor and an inverter therein, said current level sensing means sensing the current level in each circuit and producing an output signal for each current level, and means for selecting the highest amplitude signal and producing a single output signal for controlling all of said inverters.

25. A drive system as defined in claim 20, further including circuitry for selecting that input voltage having greater amplitude from a group of distinct input voltages and providing an output voltage corresponding thereto, comprising in combination, a plurality of first resistor means respectively connected to each of said switch means, a plurality of operational amplifiers each having an inverting and non-inverting input, each amplifier connected to receive an input voltage at its inverting terminal through a respective resistor means, a plurality of diode means each connected in series in the output of a respective amplifier and said diode means connecting to a common output line, and a plurality of second resistor means each respectively connected in parallel with one of said amplifiers, whereby the maximum amplitude voltage connected through the respective amplifier provides a voltage which forward biases the respective diode means to provide an output voltage proportional thereto, and said output voltage reverse biasing said other diode means to inhibit any voltage signal provided by its respective amplifier.

26. A drive system as defined in claim 20, further including circuitry for providing a current foldback circuit for limiting current through from a power source to an associated lead which circuit utilizes relatively small resistors, comprising in combination, a PNP transistor having base emitter and collector electrodes a first resistor connected in series with the base electrode of said transistor and signal coupled through said first resistor to said base electrode, a second resistor connecting the source to said emitter electrode, a third resistor connected from the emitter to the base electrode, a silicon unilateral switch connected across said second and third resistors enabling said second resistor to function as a currrent sensing resistor and said silicon unilateral switch to function as a voltage sensing and foldback device whereby at a certain level of current flow through said second resistor, said switch will conduct thereby shunting the signal to said base electrode and causing said transistor to stop conducting to thereby reduce the current to the associated load.

27. A drive system as defined in claim 20, further including circuitry for providing a foldback circuit for limiting current through from a power source to an associated lead which circuit utilizes relatively small resistors, comprising in combination, an NPN transistor having base emitter and collector electrodes, a first resistor connected in series with the base electrode of said transistor and a signal coupled through said first resistor to said base electrode, a second resistor connecting the emitter electrode to ground, a third resistor connected from the emitter to the base electrode, a silicon unilateral switch connected across said second and third resistors enabling said second resistor to function as a current sensing resistor and said silicon unilateral switch to function as a voltage sensing and foldback device whereby at a certain level of current flow through said second resistor, said switch will conduct thereby shunting the signal to said base electrode and causing said transistor to change its conducting state to change the current flow through the associated load.

28. A drive system as defined in claim 20, further including a resistor and a parallel contactor in each line of said secondary winding circuit and voltage sensing means coupled with said secondary winding circuit for opening and closing said contactor as a function of the voltage in said secondary winding.

29. A drive system as defined in claim 20, further including a plurality of drive circuits as defined in claim 20, each coupled to a variable speed A.C. motor, each of said drive circuits being sequentially activated when a previous motor is operating at rated speed, and a single power factor correction mechanism connectible to each drive circuit when the drive circuit is activated.

30. A drive system as defined in claim 29, in which each motor drives a separate liquid pump having an inlet and an outlet with said outlets connected to a common discharge having a static pressure head, a valve in each outlet, and means for driving said pumps at a reduced speed where the pressure of the liquid in said outlet is less than the static pressure head when the pump is signalled to shut down to produce a controlled reverse flow until the valve associated therewith is closed.

31. An adjustable speed pumping system comprising a plurality of adjustable speed pumps connected to a common supply and a common discharge with a valve between each pump and said discharge, a variable speed A.C. motor for each pump, each motor having a primary winding and a secondary winding, a three-phase A.C. power source connectible to the primary winding of each motor, a power circuit for each motor and coupled to said secondary winding with a resistor section in series therewith including a resistor for each line and a contactor in parallel therewith, voltage sensing means coupled to said secondary winding for opening and closing said contactor, each power recovery circuit including rectifier bridge means, inductive reactor means, and inverter means, with said bridge means converting said secondary voltage to a D.C. voltage and said inverter including a plurality of thyristors with control means for sequentially commutating said thyristors to convert said D.C. voltage to an A.C. voltage output, a secondary gating circuit for each thyristor and including voltage sensor means in series with a silicon unilateral switch (SUS) coupled to a gate electrode of a thyristor and actuable in response to sensing a peak point voltage to fire the thyristor, said control means including a current foldback circuit for each thyristor consisting of a transistor, a current sensing resistor connected in the current path of said transistor, a second silicon unilateral (SUS) connected in parallel with said current sensing resistor, said second SUS being responsive to the voltage developed by the current flow in said current sensing resistor and said SUS selectively controlling said transistor dependent on the amplitude of current flowing through current sensing resistor, solid state switch means in said bridge means and current level sensing means for sensing the current level of said A.C. voltage output from said inverter and actuating said solid state switch means when the current level exceeds a predetermined value to effectively isolate said bridge means from said inverter to cause the current in said inverter to drop, switch means between said secondary winding and said rectifier bridge means actuated in response to an associated motor approaching rated speed to effectively short said secondary winding, valve position sensing means coupled to each valve, and means connected to said sensing means and an associated motor for operating said motor at a low forward speed upon receipt of a stop command until said valve position sensing means senses a predetermined position for the valve.

32. An adjustable speed pumping system as in claim 31 further including a plurality of power recovery circuits connected to a motor, said power recovery circuits being connected in parallel with each other for providing separate current paths, means for monitoring the current flowing through said separate paths, means for comparing and selecting the maximum amplitude current flowing in said paths and providing a control signal dependent on said maximum current.

33. A method of clearing faults in a power recovery circuit for a variable speed motor driven from an A.C. source wherein said motor has primary windings coupled to said source and secondary windings coupled to a rectifier bridge means to produce a D.C. voltage from said A.C. source to a serially connected inductive reactor means which is coupled to a solid state inverter providing an A.C. voltage output operatively coupled to said A.C. source, comprising the steps of sensing the current level of the output of said inverter and producing an output signal when the current level exceeds a predetermined value, feeding said output signal to an electronic controller and activating a switch means in said rectifier bridge means to effectively short said secondary winding thereby causing the D.C. voltage to drop to substantially zero while said reactor means effectively absorbs at least one full cycle of said A.C. voltage output without saturation enabling the reactor current to drop to substantially zero to clear said fault.

34. A method as defined in claim 33, including the further step of activating said switch means when said variable speed motor is operating at a speed corresponding substantially to the full rated speed of said motor to thereby effectively eliminate said inductive reactor means and said solid state inverter from said system and reduce the impedance loss.

35. A method as defined in claim 33, in which said source is a three-phase source connected to said primary winding and a three-phase connection between said secondary winding a said rectifier bridge means, including the further step of introducing a resistance into each phase of said secondary winding and said rectifier bridge means and by-passing said resistances when said voltage is below a predetermined level, and re-introducing said resistances when said voltage is above said predetermined level.

36. A method as defined in claim 33, in which said A.C. source is a three-phase power source having a shorting thyristor coupled to each phase in said rectifier bridge defining said switch means and in which said solid state inverter includes a plurality of inverter thyristors equal in number to twice the number of said shorting thyristors, and in which each of said shorting thyristors are simultaneously activated to isolate said solid state inverter from said rectifier bridge and separate said inverter from said bridge to increase the efficiency of said circuit when the voltage output from the inverter drops below a predetermined value.

37. A method as defined in claim 33, in which there are a plurality of parallel drive circuits coupled in parallel to one motor, including the further steps of comparing the output currents of said systems and selecting the current of greatest amplitude, producing an output signal corresponding to the greatest amplitude current, and controlling each system with said signal.

38. A method as defined in claim 33, in which there are a plurality of motors sequentially activated by separate drive circuits and each motor drives a pump having a valve connected to this discharge, including the further step of operating an associated pump at a low forward speed when a stop command is received, sensing the position of the valve, and interrupting the motor circuit when the valve reaches a position corresponding substantially to the closed position.

39. A method as defined in claim 33, including the further step of producing a reference signal indicative of motor speed and isolating said power recovery circuit from said secondary winding when the motor speed approaches its rated maximum speed.

40. A method of clearing faults in a power recovery drive circuit for a variable speed driven from an A.C. source wherein said motor has primary windings coupled to said source and secondary windings coupled to means to produce a D.C. voltage from said A.C. source to a serially connected inductive reactor means which is coupled to a solid state converter providing an A.C. voltage output operatively coupled back to said A.C. source, comprising the steps of:
(a) sensing the change in current flow in the recovery circuit due to a fault in said converter;
(b) turning off the current flow from the motor to the recovery circuit in response to a fault; and,
(c) providing a reactor which can absorb at least one full cycle of A.C. line voltage without saturating, whereby the fault may be allowed to automatically clear.

41. A method as in claim 40, further including the step of providing means to de-activate said recovery circuit when a plurality of faults have occurred during a set time span.

* * * * *